(12) United States Patent
Choi

(10) Patent No.: US 11,986,755 B2
(45) Date of Patent: May 21, 2024

(54) DOUBLE PIPE FOR UNIFORMLY DISTRIBUTING FLOW

(71) Applicant: TECHNOLOGY TRADING, LLC., Seoul (KR)

(72) Inventor: Young-Hwa Choi, Gunpo-si (KR)

(*) Notice: Subject to any disclaimer, the term of this patent is extended or adjusted under 35 U.S.C. 154(b) by 413 days.

(21) Appl. No.: 17/421,781

(22) PCT Filed: Nov. 14, 2019

(86) PCT No.: PCT/KR2019/015517
§ 371 (c)(1),
(2) Date: Jul. 9, 2021

(87) PCT Pub. No.: WO2020/145499
PCT Pub. Date: Jul. 16, 2020

(65) Prior Publication Data
US 2022/0088514 A1     Mar. 24, 2022

(30) Foreign Application Priority Data
Jan. 11, 2019   (KR) .................. 10-2019-0004000

(51) Int. Cl.
| | | |
|---|---|---|
| F15D 1/02 | (2006.01) | |
| B01D 35/02 | (2006.01) | |
| F16L 41/03 | (2006.01) | |
| F16L 55/00 | (2006.01) | |

(52) U.S. Cl.
CPC .............. *B01D 35/02* (2013.01); *F15D 1/02* (2013.01); *F16L 41/03* (2013.01); *F16L 55/00* (2013.01)

(58) Field of Classification Search
CPC ..... F16L 9/18–9/20; F16L 39/005; F15D 1/02
USPC .................................................... 138/114, 39
See application file for complete search history.

(56) References Cited

U.S. PATENT DOCUMENTS

| | | | | |
|---|---|---|---|---|
| 3,601,320 A | * | 8/1971 | Plessis ................ | A01G 25/023 |
| | | | | 239/553.3 |
| 3,610,538 A | * | 10/1971 | Enders ..................... | F22D 1/32 |
| | | | | 239/553.3 |
| 4,922,958 A | * | 5/1990 | Lemp ..................... | F16L 41/03 |
| | | | | 123/456 |

(Continued)

FOREIGN PATENT DOCUMENTS

| | | |
|---|---|---|
| CN | 201618444 U | 11/2010 |
| JP | 2730299 B2 | 3/1998 |

(Continued)

OTHER PUBLICATIONS

English Specification of 10-1282133.

(Continued)

*Primary Examiner* — Patrick F Brinson
(74) *Attorney, Agent, or Firm* — ANTONIO HA & U.S. PATENT, LLC

(57) ABSTRACT

The present invention relates to a double pipe and, more specifically, to a double pipe for uniformly distributing a flow, which can distribute as uniformly as possible a flow which should be distributed toward branch pipes thereof. The present invention relates to a double pipe for uniformly distributing a flow, and can be applied to a seawater desalination device or a water purification device using a membrane and can be thus employed in the water treatment plant industry.

7 Claims, 4 Drawing Sheets

(56) References Cited

U.S. PATENT DOCUMENTS

| | | | | |
|---|---|---|---|---|
| 5,474,102 A | * | 12/1995 | Lopez | F16L 41/03 |
| | | | | 137/271 |
| 6,062,308 A | * | 5/2000 | Flood | E21B 36/00 |
| | | | | 166/57 |
| 8,707,988 B2 | * | 4/2014 | Glomset | A01K 63/00 |
| | | | | 137/561 A |
| 10,058,829 B2 | * | 8/2018 | Ladd | B01F 25/435 |
| 2013/0025875 A1 | | 1/2013 | Critsinelis et al. | |

FOREIGN PATENT DOCUMENTS

| | | |
|---|---|---|
| JP | H11-239719 A | 9/1999 |
| KR | 10-1282133 | 7/2013 |
| KR | 10-2019622 | 9/2019 |

OTHER PUBLICATIONS

English Specification of CN201618444U.
English Specification of JP2730299B2.
English Specification of JPH11-239719A.
English Specification of 10-2019622.

\* cited by examiner

DOUBLE PIPE FOR UNIFORMLY DISTRIBUTING FLOW

TECHNICAL FIELD

The present disclosure relates to a double pipe and, more specifically, to a double pipe for uniformly distributing a flow, which can distribute as uniformly as possible a flow which should be distributed toward branch pipes thereof.

BACKGROUND ART

Generally, water purification devices for purifying and filtering water from its source water containing a variety of contaminants such as impurities are equipped with an inorganic membrane filter which has a thin membrane with a large number of micropores.

When source water enters a water purification device, a water purification process is carried out by filtering clean water through the pores in the filter as the source water passes through this membrane filter, with various kinds of impurities trapped in the micropores of the filter.

In this instance, the impurities or the like trapped in the micropores of the membrane filter are retained and accumulated inside the filter. If these impurities are accumulated to a certain level or higher, it will clog the pores in the filter, keeping water from passing through them. Thus, the filter needs to be replaced regularly.

FIG. 1 is a plan view of a structure of a conventional flow distribution pipe.

As illustrated in FIG. 1, in general, a plurality of membrane filters 20 employed in a large-volume water purification device are disposed in parallel between a source water supply channel 10 and a purified water discharge channel 40 that are installed parallel to each other. A plurality of source water distribution paths 40 are formed over a cylindrical source water supply channel 10, and respective membrane filters 20 are installed above the distribution paths 40 to allow for discharge through a purified water discharge channel 40 above the filters 20.

In this case, the closer to the entrance of the source water supply channel 10 the membrane filter 20, the higher the water pressure, and the farther from the entrance of the source water supply channel 10, the lower the water pressure. A difference in water pressure on a flow path of the same diameter means a difference in water volume, and, as a result, means that the filter 20 at the very front filters a relatively large amount of water.

Accordingly, a filter closer to the entrance of the source water supply channel 10 will have more impurities accumulated in it.

If the amount of impurities accumulated in the filters 20 reaches a certain level or higher, the filters 20 need to be replaced, which means that all the filters 20 should be replaced at a time, rather than merely replacing filters 20 where impurities are heavily accumulated. Since the time for replacement is set based on the most contaminated filter 20 located close to the source water supply channel 10, even a filter 20 located far from the source water supply channel 10 has to be replaced as well, which leads to an unnecessary cost.

For this reason, there arises a need to make the water pressure applied to each membrane filter uniform, in order to avoid such a waste of money. A conventional approach for this is to regulate the amount of water supplied to filters by adjusting valves that are installed on one side of each of the source water distribution paths through which source water is distributed and supplied to the filters.

However, the conventional method has drawbacks such as making the device complex and increasing initial installation costs and maintenance costs since respective valves and compressors need to be installed on a plurality of source water distribution paths. Another problem is that the valves make the entrance narrow to regulate the amount of water passing through the membrane filters, which causes a rise in water pressure at a particular portion as a trade-off and therefore leads to a reduction in the lifespan of the device due to corrosion or the like.

FIG. 2 is a longitudinal sectional view of another structure of a conventional flow distribution pipe which was devised to solve these problems.

As illustrated in FIG. 2, another structure of the conventional flow distribution pipe is an inter-filter water pressure distribution structure for a water purification device which obtains purified water by distributing and supplying source water to a plurality of filters, and includes a hollow, pipe-shaped outer inlet flow path 50 formed with an inlet hole 51 at one end and closed at the other end, a plurality of distribution flow paths 60 extending along one side of the outer periphery of the outer inlet flow path 50 and communicating to the inside of the outer inlet flow path 50, and an inner inlet flow path 70 inserted into the outer inlet flow path 50 and formed in the shape of a hollow pipe, with a source water inlet 71 at one end which is exposed externally through the inlet hole 51 of the outer inlet flow path 50, a source water return hole 72 perforated at the other end, and a plurality of distribution holes 73 formed on one side of the outer periphery.

With this construction, the structure of the conventional flow distribution pipe makes the pressure and volume of water to the filters for filtration as uniform as possible by means of a two-stage water pressure distribution structure using the outer inlet flow path 50 and the inner inlet flow path 70 inserted into the outer inlet flow path 50.

However, in the structure of the conventional flow distribution pipe, the source water return hole 72 is formed at the other end of the inner inlet flow path 70, whereby source water discharged out of the inner inlet flow path 70 through the source water return hole 72 generates a vortex as it hits and bounces off an inner wall of the outer inlet flow path 50. Such a vortex can decrease the efficiency of uniform distribution of source water to the distribution flow paths 60.

DISCLOSURE

Technical Problem

In view of the above, the present disclosure has been devised to provide a double pipe for uniformly distributing a flow, which can increase water purification efficiency and allows for equal use of all of a plurality of filters for purifying source water, by making the pressure and volume of water to the filters as uniform as possible by improving the efficiency of uniform distribution of a flow introduced into the filters.

Technical Solution

A double pipe for uniformly distributing a flow that is installed in a water purification device, where water purification is done in a plurality of filters by distributing and supplying source water to the plurality of filters, the double pipe including: an outer tube with a plurality of fluid supply holes penetrated through an outer surface thereof in a length direction, spaced at regular intervals, and a plurality of branch pipes protruded to communicate to the fluid supply holes and serve as a passageway that lets in water to the plurality of filters; and an inner tube, one end of which is open to supply the source water to the inside, and the other end of which is closed inside the outer tube, with a plurality of discharge holes formed on an outer surface thereof to discharge the fluid to the outside.

The other end of the inner tube may be brought to a closed state by making tight contact with an inner side surface of the outer tube.

A separate resistance member with a through hole penetrated therethrough to pass the fluid through may be fitted in such a way as to wrap around the inner tube, in order to increase resistance to the flow of fluid flowing out through the discharge hole.

The through hole formed in the resistance member may be penetrated corresponding in position to the discharge hole formed in the inner tube.

A steel wire may be helically wound around the outer surface of the resistance member in order to increase the resistance to the flow of fluid.

A plurality of recessed grooves may be formed on the outer surface of the resistance member in order to increase the resistance to fluid flow.

A plurality of protuberances may be protruded from the outer surface of the resistance member in order to increase the resistance to fluid flow.

The outer surface of the resistance member may be curved inwards or outwards in order to increase the resistance to fluid flow.

A plurality of punched holes may be formed on the outer surface of the resistance member in order to increase the resistance to fluid flow.

Advantageous Effects

A double pipe for uniformly distributing a flow according to the present disclosure can increase water purification efficiency and allows for equal use of all of a plurality of filters for purifying source water, by making the pressure and volume of water to the filters as uniform as possible by improving the efficiency of uniform distribution of a flow introduced into the filters.

MODE FOR DISCLOSURE

Hereinafter, modes for carrying out the present disclosure will be described.

Figure 1:
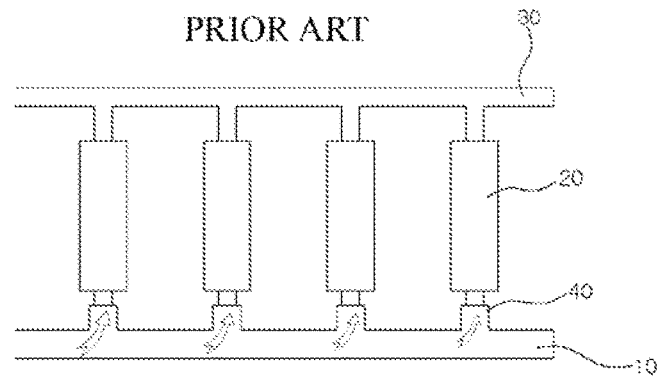
FIG. 1 is a longitudinal sectional view of a structure of a conventional flow distribution pipe.
Figure 2:
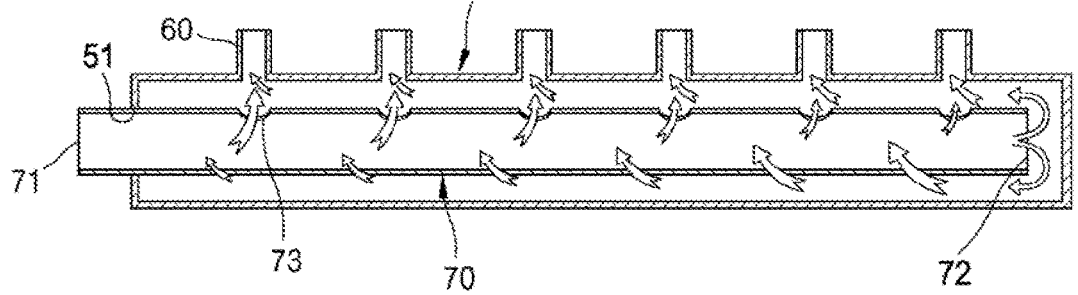
FIG. 2 is a longitudinal sectional view of another structure of a conventional flow distribution pipe.
Figure 3:
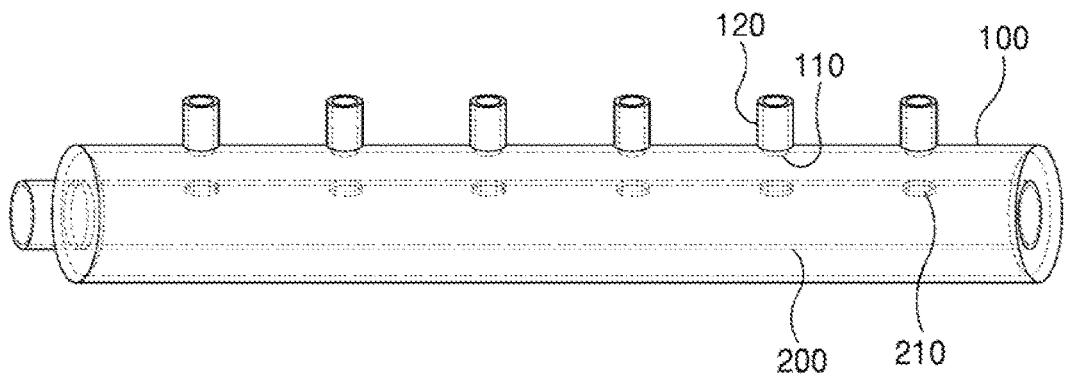
FIG. 3 is a perspective view of a structure of a double pipe for uniformly distributing a flow according to an embodiment of the present disclosure.
Figure 4:
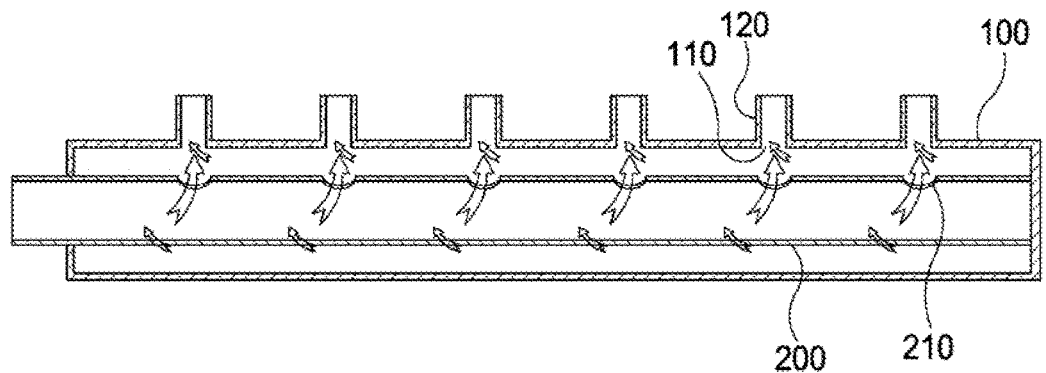
FIG. 4 is a longitudinal sectional view of the structure of a double pipe for uniformly distributing a flow shown in FIG. 3.
Figure 5:
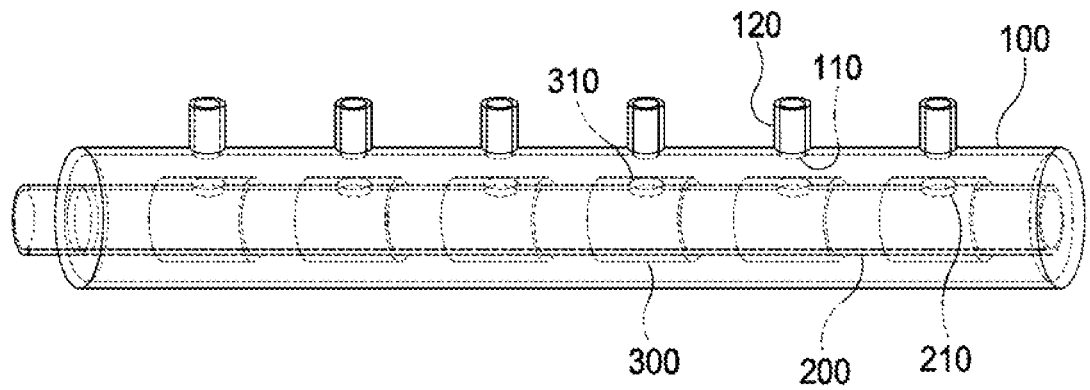
FIG. 5 is a perspective view of a structure of a double pipe for uniformly distributing a flow according to another embodiment of the present disclosure.
Figure 11:
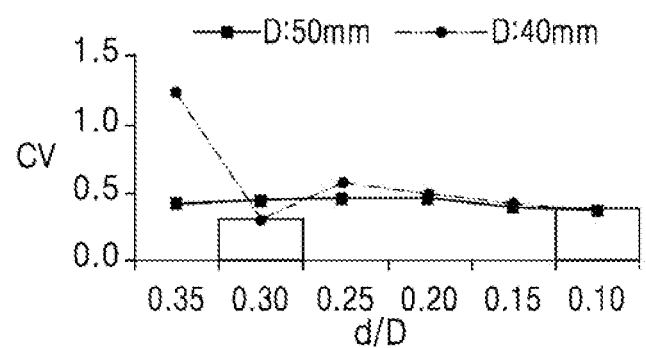
FIG. 11 is a graph illustrating the degree of uniform flow distribution of a conventional flow distribution pipe.
Figure 12:
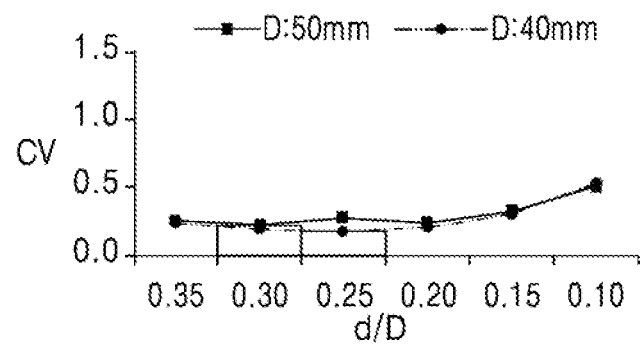
FIG. 12 is a graph illustrating the degree of uniform flow distribution of a flow distribution pipe according to an embodiment of the present disclosure.

FIG. 3 is a perspective view of a structure of a double pipe for uniformly distributing a flow according to an embodiment of the present disclosure. FIG. 4 is a longitudinal sectional view of the structure of a double pipe for uniformly distributing a flow shown in FIG. 3. FIG. 5 is a perspective view of a structure of a double pipe for uniformly distributing a flow according to another embodiment of the present disclosure. FIGS. 6 through 10 are perspective views of various structures of a resistance member installed on the double pipe for uniformly distributing a flow shown in FIG. 5. FIG. 11 is a graph illustrating the degree of uniform flow distribution of a conventional flow distribution pipe. FIG. 12 is a graph illustrating the degree of uniform flow distribution of a flow distribution pipe according to an embodiment of the present disclosure.

As illustrated in these drawings, the double pipe for uniformly distributing a flow according to an embodiment of the present disclosure is a double pipe for uniformly distributing a flow that is installed in a water purification device, where water purification is done in a plurality of filters by distributing and supplying source water to the plurality of filters, and includes: an outer tube 100 with a plurality of fluid supply holes 110 penetrated through an outer surface thereof in a length direction, spaced at regular intervals, and a plurality of branch pipes 120 protruded to communicate to the fluid supply holes 110 and serve as a passageway that lets in water to the plurality of filters; and an inner tube 200, one end of which is open to supply the source water to the inside, and the other end of which is closed inside the outer tube 100, with a plurality of discharge holes 210 formed on an outer surface thereof to discharge the fluid to the outside.

The outer tube 100 is a tubular member disposed on the outside that has a larger diameter than the inner tube 200, which is formed with a plurality of fluid supply holes 110 penetrated through the outer surface thereof along the length of the outer tube 100, spaced at regular intervals in a row.

Also, a plurality of branch pipes 120 for guiding the flow of source water discharged out of the outer tube 100 through the fluid supply holes 110 are disposed on the perimeters of the fluid supply holes 110 to communicate to the fluid supply holes 110.

Part of a flat surface of one side of the outer tube 100 is cut open to make the inner tube 200 the same diameter throughout so that the inner tube 200 is inserted, and the other side facing the one side where part of the flat surface is cut open is closed off from the outside.

As the other side is closed off from the outside, source water supplied through the inner tube 200 is discharged only through the fluid supply holes 110, so that water purification can be done after the source water has moved along the branch pipes 120.

The inner tube 200 serves to allow a fluid to be uniformly distributed inside the outer tube 100 and then discharged through the fluid supply hole holes 110 so that the same amount of fluid is discharged out of the outer tube 100 through the fluid supply holes 110 formed in the outer tube 100.

To this end, the discharge holes 210 are formed in the outer surface of the inner tube 200. A plurality of discharge holes 210 are penetrated through the outer surface of the inner tube 200, corresponding in position to the fluid supply holes 110 formed in the outer tube 100 and being spaced at regular intervals in a row.

Since the discharge holes 210 are disposed corresponding to the positions of the fluid supply holes 110, the fluid introduced into the inner tube 200 may be uniformly distributed after discharged out of the inner tube 200 through the discharge holes 210, thus allowing the fluid to be quickly discharged out of the outer tube 100 through the fluid supply holes 110.

Also, the discharge holes 210 may alternate with the fluid supply holes 110 in order to prevent the fluid discharged out of the inner tube 200 through the discharge holes 210 from being discharged directly out of the outer tube 100 through the fluid supply holes 110 formed in the outer tube 100. Thus, it is possible to secure sufficient time for the fluid to mix within the outer tube 100, allowing the same amount of fluid to be discharged out of the outer tube 100 through the fluid supply holes 110.

To make flow distribution more uniform and effective, one end of the inner tube 200 may be extended out through one open side of the outer tube 100, one side of which is extended out of the outer tube 100 and open to let in a fluid, and the other end of which is closed.

The other end of the inner tube 200 may be closed by using a separate member, or the other end of the inner tube 200 may be brought to a closed state by making tight contact with an inner side surface of the outer tube 100.

In the double pipe for uniformly distributing a flow according to the present disclosure, the other end of the inner tube 200 is brought to a closed state by making tight contact with an inner side surface of the outer tube 100. In the case of this structure, there is no gap between the other end of the inner tube 200 and the inner side surface of the outer tube 100. Thus, no vortex is formed in the gap, thereby allowing for more uniform flow distribution.

Meanwhile, as illustrated in FIG. 5, a separate resistance member 300 with a through hole 310 penetrated therethrough to pass the fluid through may be fitted in such a way as to wrap around the inner tube 200, in order to increase resistance to the flow of fluid flowing out through the discharge hole 210.

The resistance member 300 may be disposed on the outer surface of the inner tube 200, being larger in diameter than the inner tube 200 and smaller in diameter than the outer tube 100, and two opposite sides of the resistance member 300 may make tight contact with the outer surface of the inner tube 200 to keep a fluid from moving to the opposite sides of the resistance member 300.

Also, a through hole 310 may be penetrated through an outer surface of the resistance member 300 so that a fluid discharged out of the inner tube 200 through the discharge hole 210 is discharged out of the resistance member 300.

The through hole 310 formed in the resistance member 300 may be penetrated corresponding in position to the discharge hole 210 formed in the inner tube 200, thereby allowing a fluid introduced into the inner tube 200 to be uniformly distributed and then quickly discharged out along the branch pipe 120 connected to the outer tube 100.

Moreover, a means for increasing resistance in various ways may be formed on the outer surface of the resistance member 300, in order to uniformly distribute the fluid and then discharge it out of the outer tube 100 through its respective branch pipe 120 by increasing the resistance to the flow of fluid.

Figure 6:
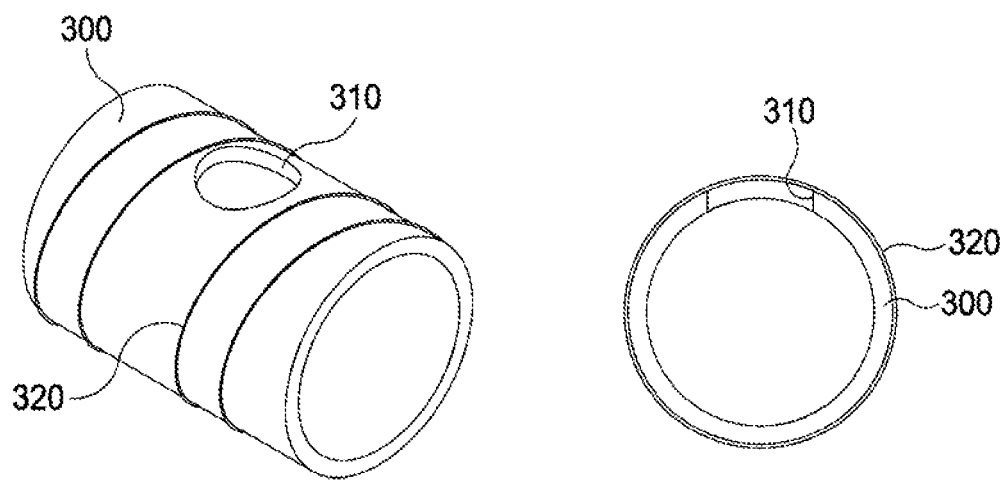
FIGS. 6 through 10 are perspective views of various structures of a resistance member installed on the double pipe for uniformly distributing a flow shown in FIG. 5.

As illustrated in FIG. 6, a steel wire 320 may be helically wound around the outer surface of the resistance member 300 in order to increase the resistance to the flow of fluid.

In a case where a steel wire 320 is helically wound around the outer surface of the resistance member 300, a fluid discharged out of the resistance member 300 through the through hole 310 may create a helical flow to a certain extent. Thus, the resistance to flow may be increased until the fluid is discharged to the branch pipe 120 through the fluid supply hole 110 formed in the outer tube 100, thereby allowing for uniform distribution.

Figure 7:
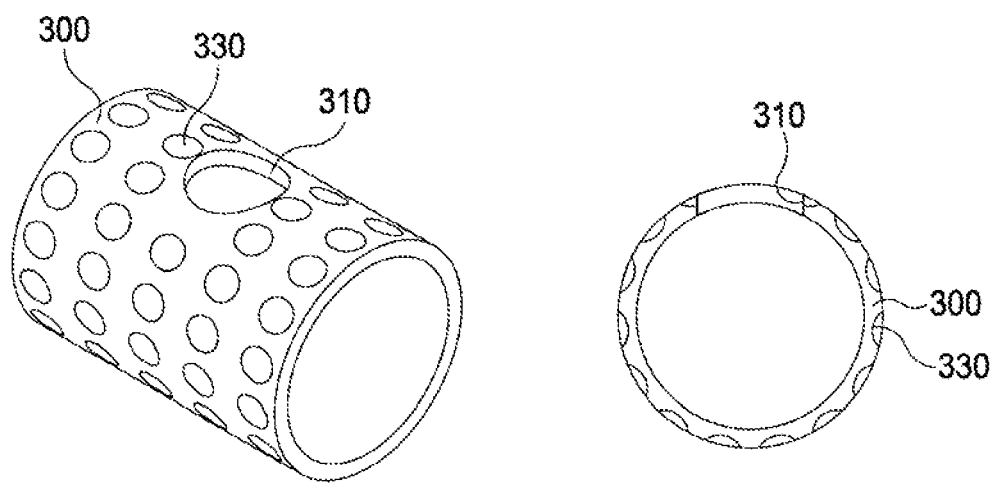

As illustrated in FIG. 7, a plurality of recessed grooves 330 may be formed on the outer surface of the resistance member 300 in order to increase the resistance to fluid flow.

In a case where a plurality of recessed grooves 330 are formed on the outer surface of the resistance member 300, the recessed grooves 330 help increase friction between a fluid discharged out of the resistance member 300 through the through hole 310 and the surface of the resistance member 300. Thus, the resistance to flow may be increased until the fluid is discharged to the branch pipe 120 through the fluid supply hole 110 formed in the outer tube 100, thereby allowing for uniform distribution.

Figure 8:
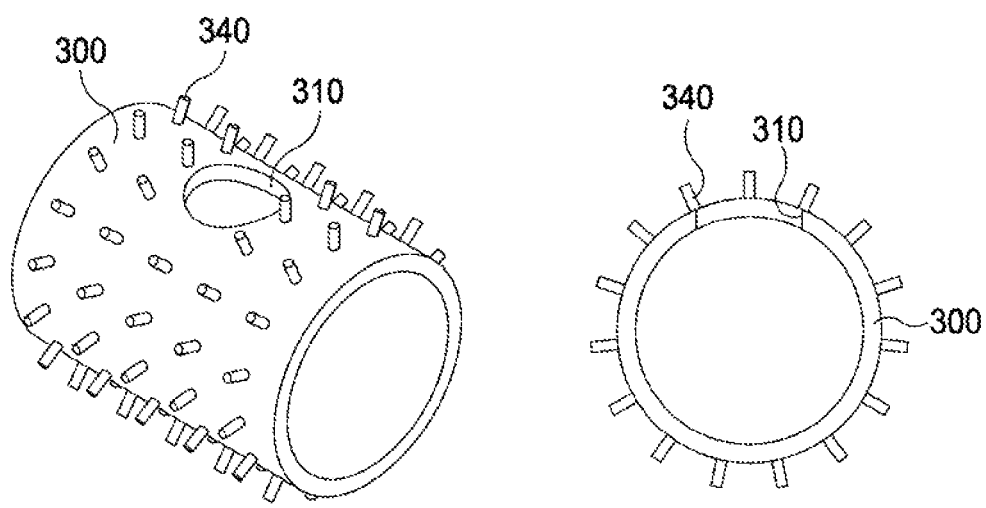

As illustrated in FIG. 8, a plurality of protuberances 340 may be protruded from the outer surface of the resistance member 300 in order to increase the resistance to fluid flow.

In a case where a plurality of protuberances 340 are protruded from the outer surface of the resistance member 300, the flow of a fluid discharged out of the resistance member 300 through the through hole 310 is disturbed by the plurality of protuberances 340. Thus, the resistance to flow may be increased until the fluid is discharged to the branch pipe 120 through the fluid supply hole 110 formed in the outer tube 100, thereby allowing for uniform distribution.

Figure 9:
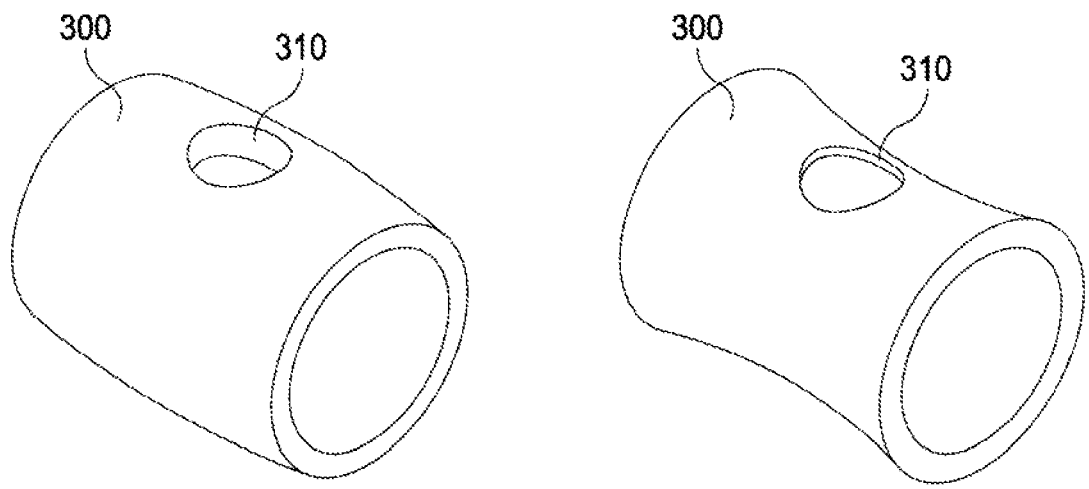

As illustrated in FIG. 9, the outer surface of the resistance member 300 may be curved inwards or outwards in order to increase the resistance to fluid flow.

In a case where the outer surface of the resistance member 300 is curved inwards or outwards, it takes more time for a fluid to contact the outer surface of the resistance member 300. Thus, the resistance to flow may be increased until the fluid is discharged to the branch pipe 120 through the fluid supply hole 110 formed in the outer tube 100, thereby allowing for uniform distribution.

Figure 10:
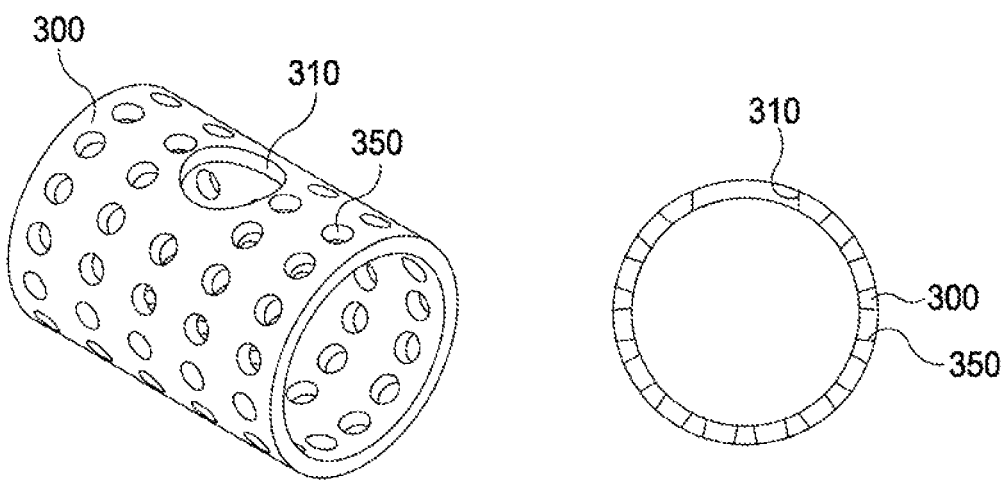

As illustrated in FIG. 10, a plurality of punched holes 350 may be formed on the outer surface of the resistance member 300 in order to increase the resistance to fluid flow.

In a case where a plurality of punched holes 350 are formed on the outer surface of the resistance member 300, a fluid discharged through the discharge hole 210 of the inner tube 200 is also discharged out of the resistance member 300 through the plurality of punched holes 350, thereby generating a vortex. Thus, the resistance to flow may be increased until the fluid is discharged to the branch pipe 120 through the fluid supply hole 110 formed in the outer tube 100, thereby allowing for uniform distribution.

A process in which a fluid is uniformly distributed by a double pipe with this structure for uniformly distributing a flow according to the present disclosure will be described below.

When a fluid is injected through one side of the inner tube 200 which is extended outward from one side of the outer tube 100, the fluid is discharged out of the inner tube 200 through the discharge holes 210 formed on the outer surface of the inner tube 200.

As the fluid discharged out of the inner tube 200 is discharged out of the resistance members 300 through the through holes 310 formed in the resistance members 300, the fluid is uniformly distributed and discharged to the plurality of branch pipes 120 through the fluid supply holes 110 formed in the outer tube 100 by using a means formed in the outer tube 100 to increase resistance to fluid flow, as well as by means of the resistance members 300 themselves.

Below is a description of how uniformly a fluid introduced into the inner tube 200 is distributed when discharged out of the outer tube 100 through the branch pipes 120.

Suppose that the diameter of the inner tube 200 is denoted by D and the diameter of the branch pipes 120 is denoted by d, which are used as variables. For these variables, a conventional flow distribution pipe structure and a double pipe structure for uniformly distributing a flow according to the present disclosure are compared by using their coefficients of variation as an index.

Here, the coefficient of variation (CV) is a coefficient used to compare scatter plots of different mean values. It means that the lower the coefficient of variation, the higher the degree of uniformity. The coefficient of variation is the standard deviation divided by the mean.

Firstly, the degree of uniform flow distribution of the conventional flow distribution pipe having an open configuration, in which an end of the inner inlet flow path 70 disposed inside the outer inlet flow path 50 is open, is depicted in the graph in FIG. 11. On the other hand, the degree of uniform flow distribution of the double pipe for uniformly distributing a flow according to the embodiment of the present disclosure is depicted in the graph in FIG. 12.

In the graphs in FIGS. 11 and 12, the conventional flow distribution pipe has a CV value of 0.373 when D is 50 mm and d is 5 mm, and the conventional flow distribution pipe has a CV value of 0.310 when D is 40 mm and d is 12 mm.

On the other hand, the double pipe for uniformly distributing a flow according to the present disclosure has a CV value of 0.215 when D is 50 mm and d is 5 mm, and the double pipe for uniformly distributing a flow according to the present disclosure has a CV value of 0.172 when D is 40 mm and d is 12 mm.

This indicates a decrease of 0.158 in CV when D is 50 mm and d is 5 mm and a decrease of 0.138 in CV when D is 40 mm and d is 12 mm.

Therefore, it can be said that the present disclosure has achieved a significant improvement in the degree of flow distribution across the branch pipes 120, as compared to the conventional flow distribution pipe in which an end of the inner inlet flow path 70 is open. As such, the present disclosure can increase water purification efficiency and allows for equal use of all of a plurality of filters for purifying source water, by making the pressure and volume of water to the filters as uniform as possible by improving the efficiency of uniform distribution of a flow introduced into the filters.

INDUSTRIAL APPLICABILITY

The present disclosure relates to a double pipe for uniformly distributing a flow, and can be applied to a seawater desalination device or a water purification device using a membrane and can be thus employed in the water treatment plant industry.

The invention claimed is:

1. A double pipe for uniformly distributing a flow that is installed in a water purification device, where water purification is done in a plurality of filters by distributing and supplying source water to the plurality of filters, the double pipe comprising:
an outer tube with a plurality of fluid supply holes penetrated through an outer surface thereof in a length direction, spaced at regular intervals, and a plurality of branch pipes protruded to communicate to the fluid supply holes and serve as a passageway that lets in water to the plurality of filters; and
an inner tube, one end of which is open to supply the source water to the inside, and the other end of which is closed inside the outer tube, with a plurality of discharge holes formed on an outer surface thereof to discharge the fluid to the outside, wherein the other end of the inner tube is brought to a closed state by making tight contact with an inner side surface of the outer tube, and wherein a separate resistance member with a through hole penetrated therethrough to pass the fluid through is fitted in such a way as to wrap around the inner tube, in order to increase resistance to the flow of fluid flowing out through the discharge hole.

2. The double pipe of claim 1, wherein the through hole formed in the resistance member is penetrated corresponding in position to the discharge hole formed in the inner tube.

3. The double pipe of claim 1, wherein a steel wire is helically wound around the outer surface of the resistance member in order to increase the resistance to the flow of fluid.

4. The double pipe of claim 1, wherein a plurality of recessed grooves are formed on the outer surface of the resistance member in order to increase the resistance to fluid flow.

5. The double pipe of claim 1, wherein a plurality of protuberances are protruded from the outer surface of the resistance member in order to increase the resistance to fluid flow.

6. The double pipe of claim 1, wherein the outer surface of the resistance member is curved inwards or outwards in order to increase the resistance to fluid flow.

7. The double pipe of claim 1, wherein a plurality of punched holes are formed on the outer surface of the resistance member in order to increase the resistance to fluid flow.

* * * * *